United States Patent [19]

Schmidt et al.

[11] Patent Number: 4,775,385

[45] Date of Patent: Oct. 4, 1988

[54] PROCESS FOR DYEING LEATHERS, WATER-SOLUBLE CATIONIC POLYMERS SUITABLE FOR THAT PURPOSE, AND PROCESS FOR THEIR PREPARATION

[75] Inventors: Rudolf Schmidt, Worms; Stephan Kleemann, Schriesheim; Fritz Wahl, Mannheim-Rheinau, all of Fed. Rep. of Germany

[73] Assignee: Benckiser-Knapsack GmbH, Ladenburg, Fed. Rep. of Germany

[21] Appl. No.: 898,461

[22] Filed: Aug. 20, 1986

[30] Foreign Application Priority Data

Aug. 27, 1985 [DE] Fed. Rep. of Germany ....... 3530478

[51] Int. Cl.[4] .............................................. D06P 3/32
[52] U.S. Cl. ...................................................... 8/436
[58] Field of Search .................... 525/329.1, 329.2; 8/436

[56] References Cited

U.S. PATENT DOCUMENTS

| | | | |
|---|---|---|---|
| 3,406,139 | 10/1968 | Hurwitz et al. | 260/29.6 |
| 3,647,769 | 3/1972 | Bufton et al. | 260/85.5 |
| 4,041,006 | 8/1977 | Fong et al. | 260/33.6 |
| 4,254,250 | 3/1981 | Glowaky et al. | 525/350 |
| 4,526,935 | 7/1985 | Wilkinson | 525/329.1 |
| 4,595,731 | 6/1986 | Wilkinson | 525/329.1 |

FOREIGN PATENT DOCUMENTS

| | | |
|---|---|---|
| 0175202 | 3/1986 | European Pat. Off. . |
| 2552750 | 8/1976 | Fed. Rep. of Germany . |
| 3201226 | 7/1983 | Fed. Rep. of Germany . |
| 3539671 | 9/1986 | Fed. Rep. of Germany . |

*Primary Examiner*—A. Lionel Clingman
*Assistant Examiner*—John F. McNally
*Attorney, Agent, or Firm*—Foley & Lardner, Schwartz, Jeffery, Schwaab, Mack, Blumenthal & Evans

[57] ABSTRACT

The invention relates to water-soluble cationic polymers and to their use in leather dyeing. The polymers preferably have K values of from about 20–45 and are obtained by reacting polyacrylonitrile or acrylonitrile copolymers in the presence of alcohols or polyols, optionally in the presence of a sulfur-containing catalyst.

8 Claims, No Drawings

PROCESS FOR DYEING LEATHERS, WATER-SOLUBLE CATIONIC POLYMERS SUITABLE FOR THAT PURPOSE, AND PROCESS FOR THEIR PREPARATION

BACKGROUND OF THE INVENTION

The primary tanning of diverse skin material can be accomplished with different tanning agents, and the leathers inevitably take on an anionic or cationic charge character which depends on the charge of the tanning agent used. The tanning agents predominantly used are of the mineral type, such as, for example, basic chromium sulfates, which initially produce a cationic leather. However, a primary tanning alone is only very rarely sufficient for producing a certain required leather quality.

This explains the need for further supplemental tanning procedures, generally referred to as retanning, with which very specific visual and/or other sensory properties are obtained. The retanning agents used for this purpose are predominantly of an anionic nature and they recharge the leather, which is cationically charged from the primary tanning, more or less anionically. After these tanning stages have been concluded to produce the predetermined leather properties for which they are designed, the majority of such leathers are additionally dyed in the wet state in the drum. In particular, for the preparation of high-quality products, such as, for example, the so-called aniline leathers, it is of the utmost importance for the subsequent process of dyeing to produce visually flawless, uniform dyeings and not to cause any changes in the leather properties whatsoever due to any dyeing adjuvants used. For that reason there has understandably been no shortage of attempts to develop dyeing adjuvants which can meet these two main requirements, including costly syntheses of substances of apparent suitability.

Since most leather dyes are anionic, the dye is uniformly distributed in the dyeing of anionic leathers, because the like charge prevents an excessively rapid and hence nonuniform strike of the dye on the leather surface. At the same time, however, deeper penetration of the dye into the interior of the fine or extremely fine fibers is also effected, as a result of which the visible leather surface appears to be short of color, i.e., paler.

The dyeings are therefore in general relatively uniform, but not sufficiently deep. This could be partially compensated by using more dye, but dyes are very costly and the bonding sites for dyes are limited. Additional bonding sites in the leather can be created by acidifying, and thus cationizing, the amphoteric leather system. This is generally done by adding acid, for certain reasons preferably formic acid. In addition to the fact that even in this way the necessary dye quantities cannot be satisfactorily fixed, a considerable disadvantage results in particular in the case of dyeing chrome tanned leathers, namely, that formic acid redissolves chrome constituents out of the leather and thereby impermissibly pollutes the liquors and waste waters with chromium.

SUMMARY OF THE INVENTION

It is therefore an object of the present invention to provide a cationic dyeing adjuvant which is capable of effecting such pronounced charge shifts that the cationization by means of formic acid becomes wholly or at least substantially dispensable.

Another object of the invention resides in providing a cationic dyeing adjuvant and a process of using it which guarantees that, in the case of the very high cationic charge of the treated leather, the anionic dye is obtained at the surface in very concentrated form, although uniformly, so that the result is a very satisfactory evenness.

It is also an object of the invention to provide a dyeing adjuvant and a process of using it wherein low amounts of the adjuvant can be employed to provide an economical process.

Still another object of the invention is to achieve a distinct saving in costly dyes in the dyeing of cationized leathers in relation to leathers which have not been treated.

Another object of the invention resides in the provision of a novel process for preparing the dyeing adjuvants according to the invention.

In accomplishing the foregoing objects, there has been provided according to one aspect of the present invention a process for preparing water-soluble polymers having a predetermined desired K value, or salts thereof, comprising the steps of:

reacting polyacrylonitrile or acrylonitrile copolymers containing at least 20% acrylonitrile and up to 80% acrylic acid derivatives or a copolymerizable vinyl compound, with one or more polyamines at a temperature of between about 100°–240° C., the reaction being carried out in the presence of a mono-alcohol or polyol having a boiling point of above about 95° C. until the desired K value is obtained; and subsequently treating the reaction product with water or a mixture of water and a water-miscible organic solvent at a temperature of from about 70°–100° C. In a preferred embodiment, the predetermined K value is between about 20–45, and the reaction is carried out under atmospheric or superatmospheric pressure at a temperature of from about 100°–180° C., preferably at 130°–160° C., for a period of from about 10 minutes to 6 hours, preferably 2–3 hours, in the presence of from about 0.5–10 mol % of a sulfur-containing catalyst, until the desired K value is obtained. In an alternative embodiment, the reaction is carried out at a temperature of from about 140°–240° C. under atmospheric or superatmospheric pressure for a period of from about 2–10 hours, preferably 3–6 hours, in the absence of a catalyst.

In accordance with another aspect of the present invention, there has been provided a watersoluble polymer of polyacrylonitrile and a polyamine, having a K value of from about 20–45, obtained by the process as defined above.

According to still another aspect of the invention, there has been provided a process for dyeing leathers, comprising the steps of:

treating leather which is to be dyed, either before and/or during and/or after the dyeing with a polyamide-amine which is obtained by reacting polyacrylonitrile or acrylonitrile copolymers containing at least 20% acrylonitrile and up to 80% of an acrylic acid derivative or of a copolymerizable vinyl compound, with one or more polyamines at a temperature of from about 100°–240° C., the reaction being carried out in the presence of a mono-alcohol or polyol having a boiling point of above about 95° C.; and subsequently treating the reaction product with water or a mixture of water and a water-miscible organic solvent at a temperature of from about 70°–100° C.

Further objects, features and advantages of the present invention will become apparent from the detailed description of preferred embodiments which follows.

DETAILED DESCRIPTION OF THE PREFERRED EMBODIMENTS

It is surprisingly possible to meet the inherently almost contradictory requirements described above by means of a treatment with the water-soluble polymers according to the invention. preference is given to previously undescribed polymers of this kind, which are distinguished by a K value of from about 20–45. The new tanning process is therefore simple, economical and straightforward to carry out.

For the foregoing reason, the use of a whole series of commercially available cationic substances is out of the question, primarily owing to the resulting non-uniform dyeing results. Adjuvants designed specifically for the dyeing of leather are, it is true, more suitable, but they still have in some cases considerable shortcomings, so that further development or improvement appears to be necessary.

German Offenlegungsschrift No. 2,552,750 recommends the pretreatment of leathers to be dyed with polyamine resins which, however, necessitate special conditioning of the leather after such treatment, and these must be carried out within a pH range which is detrimental to certain leather qualities, such as, for example, the firm grain. As a result of the increase in pH described there, the amphoteric leather system becomes more anionic again, so that, while it is true that a certain evenness in color is obtained even without the use of dyeing adjuvants, this color evenness goes hand in hand with the above-mentioned adverse paleness in color.

The polyamines described must be synthesized from precursors which in principle are otherwise utilizable, so that their preparation is associated with a significant cost factor. In use, the amount of active substance which needs to be used is significantly higher than in the case of the polyamide-amines claimed according to the present invention. As described in German Offenlegungsschrift No. 2,552,750, for the same depth of shade, half the dye is sufficient compared with untreated leathers, while in the case using polyamideamines in accordance with the invention, one fifth of the dye is sufficient for the same depth of shade, despite the reduced amount of adjuvant being used. In addition, German Offenlegungsschrift No. 2,552,750 requires subsequent fixing with large amounts of formic acid.

German Offenlegungsschrift No. 2,539,671 describes the synthesis and use of polyglycol ether amines, the use of which is supposed to prevent mixed dyes from separating in the course of dyeing. To effect an increase in the depth of shade, 5–10 times the amount of active substance is necessary compared with the polyamide-amines used according to the present invention. Here too considerable amounts of formic acid are additionally required for fixing.

Swiss Patent No. 1598/69 describes specially synthesized polyamines suitable for the tanning of leather and dyeing. The use of these polyamines is evidently not uncritical either, since either the dyes used need to be added in uncustomarily high dilution (1:50), or, alternatively, the cationization of the leather is not effected to a sufficient degree, despite the use of 2.5 to 25 times the amount that be used in the case of the polyamide-amines according to the present invention. Therefore, in this case also, a further cationization of the leather must be accomplished by means of large amounts of formic acid, with the known disadvantages associated therewith.

German Offenlegungsschrift No. 3,201,226 describes carboxyl- and amino-containing polymer tanning agents which are used as retanning agents where the change in the leather character is clearly of prime interest. These adjuvants are merely said to have a more or less powerful color-deepening action, although here too considerably higher amounts of active substance or solid substance need to be used than in the case of the polyamlde-amines used according to the present invention.

The polyamide-amines usable according to the present invention can be synthesized in a simple way, from inexpensive starting materials which are in some instances waste products. These starting materials can be prepared, for example, as described in German Offenlegungsschrift No. 2,948,795 and U.S. Pat. Nos. 3,406,139 and 3,647,769.

It has been found, surprisingly, that by adding 0.5–10 mole equivalents of a high-boiling alcohol or polyol per mole equivalent of nitrile groups of the starting polymer, a readily water-soluble amine polymer of defined chain length is obtained in a short time and under relatively mild conditions.

The amine polymers prepared in the presence of, for example, ethylene glycol generally have a homogeneous color deepening action in the treatment of anionically after-treated leather.

The nitrile polymer (a) used as a first constituent for preparing the new amine polymers comprises polyacrylonitrile or a copolymer which has been prepared from at least 20 mol-% of acrylonitrile monomers and from acrylic acid, alkyl acrylate, methacrylic acid, alkyl methacrylate, methacrylonitrile, acrylamids, N-alkylacrylamide, N-hydroxyalkylacrylamide, N,N-dialkylacrylamide, N,N-bis(hydroryalkyl)acrylamide, methacrylamide, N-alkylmethacrylamide, N-hydroxyalkylmethacrylamide, N,N-dialkylmethacrylamide, N,N-bis(hydroxyalkyl)methacrylamide, alkyl vinyl ketone, vinyl-, allyl-, methallyl-, 2-allyloxyethane-, 2-hydroxy-3-allyloxypropane-, vinylbenzene-, vinyloxybenzene-sulfonic acid, styrene or alkyl crotonate, wherein each alkyl radical has 1–5 carbon atoms. The molecular weight ranges vary in accordance with the type of acrylonitrils polymer or copolymer used and should be within the range from about 50,000 to 5,000,000, preferably between about 100,000 and 3,000,000.

The second constituent for preparing the amine polymer comprises from about 0.6–3.0 mole equivalents per mole equivalent of nitrile groups present in polymer (a), of an aminating agent (b) selected from the group comprised of the polyamines, preferably ethylenediamine.

The third component used for preparing the amine polymer comprises from about 0.5–10 mole equivalents, per mole equivalent of nitrile groups of polymer (a), of a high-boiling alcohol, having a boiling point above about 95° C., selected from the group $C_nH_{2n+1}OH$, with $n=3-30$, preferably $n=6-10$, such as for example 1-propanol, 1-butanol, 2-butanol, 1-pentanol, 2-pentanol, 3-pentanol, 1-hexanol, 2-hexanol, 3-hexanol, 1-heptanol, 2-heptanol, 3-heptanol, 4-heptanol, 1-octanol, 1-dodecanol, benzyl alcohol, and also polyols, such as, for example, ethylene glycol, diethylene glycol, triethylene glycol, polyethylene glycol, 1,2-propanediol, 1,3-propanediol, 1,2-butanediol, 1,3-butanediol, 1,4-butanediol, 2,3-butanediol, 1,4-pentanediol, 2,3-pentanediol, 2,4-pentanediol, 1,2-hexanediol, 1,5-hexanediol, 1,6-hexanediol, 2,3-hexanediol, 2,5-hexanediol, 1,4-dimethylolcyclohexane, glycerol, 1,2,4-butanetriol, pentaerythritol, neopentylglycol, trimethylolpropane, preferably ethylene glycol. This list only represents an illustrative selection of the large number of possible alcohols. It is also possible for mixtures of such alcohols to be used.

The sulfur-containing activator used as an optional fourth constituent for preparing the amine polymer is selected from a wide range of sulfur-containing compounds. It contains from about 0.5 to 10 mol-%, based on polymer (a), of a sulfur activator from the group consisting of sulfur, hydrogen sulfide or an organosulfur compound having at least one mercapto, thiocarbonyl, thioamide or thiocarboxyl group, sulfur chlorides, polysulfides or phosphorus pentasulfide. Preferably from about 5-10 mol-% of elemental sulfur are present, although higher proportions are also possible.

In accordance with the general reaction procedure, the nitrile polymer, the aminating agent, the alcohol component and, when desired, the sulfur-containing activator are heated under atmospheric or superatmospheric pressure to a temperature of from about 100°-180° C., preferably to about 130°-160° C., for about 10 minutes to 6 hours, preferably from about 2 to 3 hours, until the desired K value of about 20-45 is obtained. To obtain more even distribution of the sulfur activator, it can be of advantage to dissolve it at 20°-60° C. in the aminating agent or part of the aminating agent before combining all the reaction components. The amine polymer formed during the condensation reaction has added to it, at the earliest on the first appearance of complete water solubility, water or a mixture of water and a water-miscible organic solvent, and it is subsequently maintained at from about 70°-100° C. for about 10-90 minutes, preferably at about 80°-90° C. for about 20-40 minutes. The optimal reaction parameters may be determined by means of experimental series in each case depending on batch size and conditions. In the event that the reaction is to be carried out without the sulfur catalyst, a reaction temperature of from about 140°-240° C. is necessary and, optionally, the reaction period can be extended.

Should a completely sulfide-free product be necessary for certain uses, such as, for example, for use in salt form, this can be obtained either by dispensing with the catalyst or by removing the sulfur in a known manner, for example, by separating off the sulfur compounds as iron sulfide or by reacting with the amount of $H_2O_2$ which is at least equimolar to the catalyst content, preferably with three times the molar amount of $H_2O_2$.

If desired, the amine polymer in the form of the free base can be converted into a salt of an inorganic acid or of an organic acid by methods known per se. Mineral acids suitable for salt formation include, inter alia, hydrochloric acid, hydrobromic acid, hydroiodic acid, sulfonic acids, sulfurous acid, sulfuric acid, phosphorous acid, phosphoric acid and phosphonic acids. Organic acids suitable for salt formation include, inter alia, formic acid, acetic acid, oxalic acid, tartaric acid, citric acid, glycolic acid, propionic acid, butyric acid, isobutyric acid, benzoic acid and p-toluenesulfonic acid, with acetic acid being particularly preferred.

To prepare a salt of a mineral acid or of an organic acid, a simple acid-base neutralization is carried out. The amine polymer in the form of the free base is dissolved if necessary in a suitable solvent and neutralized with an amount of acid which is equivalent or approximately equal to the number of equivalents of amino groups present; or vice versa. The salt cam them if necessary be precipitated or otherwise removed from the solvent system. If precipitates are to be avoided, it is advisable to remove the sulfide formed by means of methods known to those skilled in the art, for example, by precipitation or oxidation. It can also be used directly.

The process according to the invention comprises certain reaction conditions which, in addition to the chemical structure, also determine the physical properties of the amine polymers. Catalyst quantities above 3.5 mol-%, based on the polyacrylonitrile polymer used, shorten the reaction time significantly and hence favor the chain shortening desired for use as a leather tanning adjuvant. It is known that elevated temperatures, high shearing forces and long reaction times lead to a shortening of the polymer chain length. On the other hand, polyamines, owing to their multifunctionality, are capable of reactions involving intermolecular chain linking. Whether chain degradation or chain lengthening predominates therefore depends to a high degree on the reaction conditions used. The reaction temperature and reaction time must therefore be adapted to each other in such a way as to effect a controlled degradation of the polymer chain until the desired K value is obtained. Preference is given to a reaction temperature of from about 130°-160° C. combined with a reaction time of from about 2-3 hours.

Owing to the ease of implementation, this process is particularly suitable for reusing the waste polymers obtained, for example, during the preparation of polyacrylonitrile. These polyacrylonitrile wastes must otherwise be disposed of by means of expensive processes, e.g., through combustion with subsequent absorption of the resulting toxic gases, such as, for example, nitrous gases or hydrogen cyanide.

The K value of the polymer is determined by the method of H. Fikentscher, Cellulosechemie 13, pages 48–64 and 71–74 (1932) in dimethylformamide (for the starting polymer used) or 1N sodium nitrate solution (for the polymers according to the invention) at 30° C. Therein $K = k \times 1000$.

Hereinafter the conversion of polyacrylonitrile polymers in accordance with the present invention into water-soluble cationic polymer solutions will be described by means of a plurality of examples.

The advantages of the polyamide-amines as water-soluble, cationic polymers in the dyeing of leather are likewise illustrated with a few examples.

Where the chemical synthesis is described, percentages are by weight. In the examples relating to the dyeing of leather, the weight percentages are in each case expressed relative to the shaved weight of the moist leather.

EXAMPLE 1

A 1 liter three-necked flask with a KPG stirrer and reflux condenser is charged with 0.32 g of sulfur in 33.0 g of ethylenediamine, and 62.0 g of ethylene glycol are mixed in with stirring. 26.5 g of polyacrylonitrile fibers containing 3% of allyl sulfonate and having a K value of 81.3 are then added, and the mixture is raised to a bath temperature of 175° C. After 2 hours at 175° C. the resulting product has added to it 451 ml of water and is maintained at 85°-90° C. for a further 30 minutes. Cooling down to room temperature is followed by removal of undissolved particles on a 0.1 mm sieve.

The reaction gives 565.1 g of a 10% strength polymer solution having a K value of 31.6 and a viscosity of 38.0 mpa.s. The yield of water-soluble polymer product is 99.9%, based on the starting polyacrylonitrile fiber.

EXAMPLE 2

A 10 liter plane-ground joint flask with a horseshoe stirrer and reflux cooling is charged with 6.4 g of elemental sulfur in 661 g of ethylenediamine, and 620 g of ethylene glycol are mixed in with stirring. 530 g of polyacrylonitrile fibers containing 3% of allyl sulfonate and having a K value of 81.3 are then added, and the mixture is raised to a bath temperature of 180° C. After 135 minutes at 180° C. the resulting product has added to it 9710 ml of water and is maintained at 85°–90° C. for a further 30 minutes. Cooling down to room temperature is followed by removal of undissolved particles on an 0.1 mm sieve.

The reaction gives 11.36 g of a 10% strength polymer solution having a K value of 30.7 and a viscosity of 35.2 mpa.s. The yield of water-soluble polymer product is 97.7%, based on the starting polyacrylonitrile fiber.

EXAMPLE 3

A 1 liter three-necked flask with a KPG stirrer and reflux condenser is charged with 1.6 g of sulfur in 33.0 g of ethylenediamine, and 31.0 g of ethylene glycol are mixed in with stirring. 26.5 g of polyacrylonitrile fibers containing 3% of allyl sulfonate and having a K value of 81.3 are then added, and the mixture is raised to a bath temperature of 175° C. After 2 hours at 175° C. the resulting product has added to it 486 ml of water and is maintained at 85°–90° C. for a further 30 minutes. Cooling down to room temperature is followed by removal of undissolved particles on a 0.1 mm sieve.

The reaction gives 570.8S g of a 10% strength polymer solution having a K value of 30.2 and a viscosity of 33.8 mpa.s. The yield of water-soluble polymer product is 100%, based on the starting polyacrylonitrile fiber.

EXAMPLE 4

A 1 liter three-necked flask with a KPG stirrer and reflux condenser is charged with 1.6 g of sulfur in 33.0 g of ethylenediamine, and 31.0 g of ethylene glycol are mixed in with stirring. 26.5 g of polyacrylonitrile fibers containing 3% of allyl sulfonate and having a K value of 81.3 are then added, and the mixture is raised to a bath temperature of 145° C. After 3 hours at 145° C. the resulting product has added to it 474 ml of water and is maintained at 85°–90° C. for a further 30 minutes. Cooling down to room temperature is followed by removal of undissolved particles on a 0.1 mm sieve.

The reaction gives 557.7 g of a 10% polymer solution having a K value of 29.0 and a viscosity of 30.4 mpa.s. The yield of water-soluble polymer product is 97.7%, based on the starting polyacrylonitrile fiber.

EXAMPLE 5

A 160 liter stirred kettle with condensation unit is charged with 3.0 g of sulfur in 15.8 g of ethylenediamine, and 15.8 kg of ethylene glycol are mixed in with stirring. 13.5 kg of polyacrylonitrile fibers containing 3% of allyl sulfonate having a K value of 81.3 are then added, and the mixture is raised to a temperature of 140° C. After 3 hours at this temperature the resulting product is diluted with water to a 10% strength solution and is maintained at 85°–90° C. for a further 30 minutes. Cooling down to room temperature is followed by removal of undissolved particles on an 0.1 mm sieve.

The reaction gives 310 kg of a 10% strength polymer solution having a K value of 31.8 and viscosity of 40.1 mpa.s. The yield of water-soluble polymer product is 100%, based on the starting polyacrylonitrile fiber.

EXAMPLE 6

Cationic, chrome-tanned wet-blue leather shaved to 1.8 mm was tumbled for 1 hour with 300% of water at 45° C. and 5% of a commercially available 35% strength aqueous solution of polyacrylate having a Fikentscher K value of 23 in a tanning drum and, in the course of the treatment, was anionically recharged analogously to retanning. The liquor was discharged, and then the anionically after-treated leather had added to it a wash liquor of 200% water at 60° C. and was tumbled for 10 minutes.

Thereafter this liquor was likewise discharged. The subsequent dyeing was effected in a liquor of 200% water at 60° C., in which 1% dye (CI Acid Brown 270) was dissolved 1:20 in water and introduced into the rotating tanning drum at a uniform rate. After 20 minutes of tumbling, 7% of commercially available fat-liquoring mixture was added. After a further 20 minutes of tumbling, 1% formic acid (85% strength, diluted 1:5) was added to fix the dye and the fatty substances during a tumbling period of 40 minutes. Thereafter the dyed leather was dried in air, was mechanically finished and was subjected to a measurement of the depth of shade using the Elrepho instrument (from Zeiss, Y filter). EW=11.0.

The meaning of the measured numerical value is that the lower the measured Elrepho value (EW), the deeper the surface dyeing. To guarantee an absolute comparison, the material used in Examples 6–11 came from one hide, and all other conditions, substances, incidental treatments and settings except for the cationic adjuvants were kept the same.

EXAMPLE 7

Chrome-tanned leather was anionically treated with polyacrylate analogously to Example 6. The rinse was followed by a cationic recharge with polyamide-amines obtained as in Examples 1–5 in a manner according to the invention by adding 200% water at 60° C. and 0.2% active substance of polyamide-amines according to the invention to the rinsed leathers and tumbling for 30 minutes. This recharge was followed by the addition of the dissolved dye, fat-liquoring and also fixing with formic acid, although the dye and the fatty substances had been exhausted and fixed so efficiently that the addition of formic acid could have been omitted. The addition was effected to maintain the claim of absolutely identical treatment. The leather was finished and measured with the Elrepho. EW=3.3.

EXAMPLE 8

Example 7 was repeated, except for the sole difference that a leather was treated not with polyamide-amines according to the invention but with 0.2% of active substance of a commercially available product based on dicyandiamide-formaldehyde resin (Retingan R 4 B (Bayer) powder, about 97.5% strength). EW=6.1.

EXAMPLE 9

Analogously to Example 7, the cationic treatment was effected with 0.2% of active substance of a commercially available product based on polyquaternary amine/ethylene oxide adduct (Invaderm S, (Ciba-Geigy) Liquid product, about 25% strength). EW=6.1.

EXAMPLE 10

Analogously to Example 7, the cationic treatment was effected with 0.2% of active substance of a commercially available product based on a ureaformaldehyde condensation product (Bastamol B (BASF) powder, 100% strength). EW=4.1.

EXAMPLE 11

Analogously to Example 7, the cationic treatment was effected with 0.2% of a commercially available product based on a condensation product of cyanamide derivatives and formaldehyde (Levogen HW (Bayer) liquid product, about 48% strength). EW=4.2.

TABLE

| Example | Surface dyeing of leather as a function of dyeing method Active Substance | EW |
|---|---|---|
| 1 | Control without active substance | 11.0 |
| 2 | Polyamide-amines according to the invention | 3.1–3.3 |
| 3 | Dicyandiamide-formaldehyde resin | 6.1 |
| 4 | Polyquarternary amine/ethylene oxide adduct | 6.1 |
| 5 | Urea-formaldehyde condensation product | 4.1 |
| 6 | Cyanamide derivative/formaldehyde condensation product | 4.2 |

In evaluating the EW numbers, a proportional yardstick must not be applied. It is true that the lower the EW the deeper the dye, but a change in a numerical value in the lower range corresponds to a significantly larger difference in depth of shade than the change of the numerical value in the upper range. Thus, a difference between a dyeing having an EW of 3.3 and a dyeing having an EW of 3.4 is apparent to the naked eye on looking at the leather surface, this difference corresponding approximately to that between EW=10.0 and EW=11.0.

EXAMPLE 12

Goatskins tanned with chrome, vegetable-retanned with mimosa tanning agent and dried are commercially traded as leather intermediates under the label chromosa goatskins, and they are used by various tanneries as a starting material for leather manufacture.

A chromosa goatskin was halved, and one-half was homogeneously softened with 500% of water (all the following percentages are based on the dry weight of the leather) at 40° C. during a tumbling time of 1 hour in a tanning drum.

After discharge of the softening liquor, the dyeing was effected in a fresh bath of 100% water at 40° C. by pulverulent addition of 5% of a commercially available leather dye of a gray shade into the tanning drum. 200% water at 60° C. and 9% of a mixture of commercially available fat liquor were added and tumbled for 30 minutes. The dye and the fatty substances were fixed by addition of 2% formic acid (diluted 1:5 with water) during a tumbling time of 40 minutes, during which a pH value of 3.7, which is customary for this part of the process, was reached. Liquor exhaustion was nonetheless very poor.

The leather was washed with 500% of water at 20° C. during a tumbling time of 15 minutes, was squeezed free from the liquor and was subsequently dried in air. After the mechanical finishing of the leather the grain side and the split side of the leather (suede leather) were measured with the Elrepho.

EW grain side=14.5
EW suede side=11.5

EXAMPLE 13

The other, still untreated half of the chromosa goatskin of Example 12 was likewise softened, and the softening liquor was discharged. The leather was then treated in a fresh liquor of 100% water at 40° C. with 0.2% of the active substance as per Example 1 for a tumbling time of 30 minutes. Thereafter, as in Example 12, the same amount of the same dye was added and, because of the absolute analogy, all other process steps including fixing were carried out. The liquor was thoroughly exhausted.

EW grain side=5.8
EW suede side=7.6.

EXAMPLE 14

A chromosa goatskin was halved and one-half was softened in a tanning drum with 500% water at 40° C. for a tumbling time of 1 hour. The softening liquor was then discharged. A fresh liquor of 100% water at 40° C. had 5% of a mixture of commercially available leather dyes in powder form added to it, which was followed by 30 minutes of tumbling.

200% water at 60° C. and 9% of a mixture of a commercially available fat-liquors were then added, which was followed by a further 30 minutes of tumbling. To exhaust and fix the fatty substances and dyes, 2% of 85% strength formic acid (diluted 1:5 with water) then had to be added and tumbled for 40 minutes. This liquor was discharged, and the leather was washed in a fresh liquor of 500% water at 20° C. for a tumbling time of 15 minutes. After drying and mechanical finishing of the leather, the surface was measured with the Elrepho.

EW grain side=15.6
EW flesh side=10.8.

EXAMPLE 15

The other, still untreated half of the skin of Example 14 was likewise softened, and the softening liquor was discharged. The leather was then treated in a fresh liquor of 100% water at 40° C. with 0.2% of active substance of polyamide-amines according to the invention for a tumbling time of 30 minutes. A fifth of the amount (=1%) of the dye mixture of Example 14 was then added in powder form, which was followed by tumbling and fat-liquoring as in Example 14.

Both the dyes and the fatty substances were exhausted so thoroughly that additional fixing with formic acid could have been omitted. However, for analogy the leather was finished exactly as in Example 14.

EW grain side=14.5
EW suede side=7.3.

Comparing the EWs shows that, despite reducing the amount of dye by 80%, both the grain side and the suede side of leather treated in accordance with the invention with polyamide-amines have been dyed deeper. It was also observed, very surprisingly, that this small amount of dye was distributed absolutely homogeneously despite the deep shade.

What is claimed is:

1. A process for dyeing leathers, comprising the steps of:

treating the leather with a polyamide-amine which is obtained by a process comprising the steps of:

reacting polyacrylonitrile or acrylonitrile copolymers containing at least 20 mol-% acrylonitrile and up to 80% mol-% of at least one monomer selected from the group consisting of acrylic acid, alkyl esters and amides of acrylic acid, methacrylic acid, alkyl esters and amides of methacrylic acid, sulfonic acids containing a copolymerizable vinyl group, styrene, alkyl crotonate, and methacrylonitrile wherein each alkyl radical has 1–5 carbon atoms, with one or more polyamines at a temperature of from about 100°–240° C., the reaction being carried out in the presence of a mono-alcohol or polyol having a boiling point of above about 95° C. until the desired K value is obtained; and subsequently treating the reaction product with water or a mixture of water and a water-miscible organic solvent at a temperature of from about 70°–100° C.

2. A process as claimed in claim 1, wherein the polyamide-amine has a K value of from about 20–45.

3. A process as claimed in claim 1, wherein the polyamide-amine is present as an aqueous solution having an active substance content of from about 1–50%.

4. A process as claimed in claim 1, wherein the leather to be dyed is treated in aqueous liquors with 0.01–1% of a polyamide-amine based on the weight of the leather.

5. A process as claimed in claim 1, wherein the treatment liquor and the leather contained therein are of a temperature between about 20°–30° C. and at a pH value of from about 4–9.

6. A process as claimed in claim 1 wherein the acrylonitrile copolymer comprises at least 20 mol-% acrylonitrile and up to 80% mol-% of at least one monomer selected from the group consisting of acrylic acid, alkyl acrylate, methacrylic acid, alkyl methacrylate, methacrylonitrile, acrylamide, H-alkylacrylamide, N-hydroxyalkylacrylamide, N,N-dialkylacrylamide, N,N-bis(hydroxyalkyl)acrylamide, methacrylamide, N-alkylmethacrylamide, N-hydroxyalkylmethacrylamide, N,N-dialkylmethacrylamide, N,N-bis(hydroxyalkyl)methacrylamide, alkyl vinyl ketone, vinyl-, allyl-, methallyl-, 2-allyloxethane-, 2-hydroxy-3-allyloxypropane-, vinylbenzene-, vinyloxybenzene-sulfonic acid, sytrene and alkyl crotonate.

7. A process as claimed in claim 1 wherein the reaction product has a molecular weight between about 50,000 and 5,000,000.

8. A process as claimed in claim 1 wherein the reaction product has a molecular weight between about 100,000 and 3,000,000.

* * * * *